(12) United States Patent
Takahashi et al.

(10) Patent No.: US 6,553,171 B1
(45) Date of Patent: Apr. 22, 2003

(54) OPTICAL COMPONENT HAVING POSITIONING MARKERS AND METHOD FOR MAKING THE SAME

(75) Inventors: Fumio Takahashi, Yokohama (JP); Fumitaka Yoshino, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 3 days.

(21) Appl. No.: 09/868,662

(22) PCT Filed: Oct. 20, 2000

(86) PCT No.: PCT/JP00/07336

§ 371 (c)(1),
(2), (4) Date: Jun. 19, 2001

(87) PCT Pub. No.: WO01/29601

PCT Pub. Date: Apr. 26, 2001

(30) Foreign Application Priority Data

Oct. 21, 1999 (JP) .......................................... 11-299708

(51) Int. Cl.[7] ................................................. G02B 6/10
(52) U.S. Cl. .......................................... 385/131; 385/14
(58) Field of Search .......................... 385/2, 8, 14, 123, 385/129, 131–132

(56) References Cited

U.S. PATENT DOCUMENTS

| | | | |
|---|---|---|---|
| 6,294,232 B1 | * 9/2001 | Yamauchi ..................... | 428/27 |
| 6,324,314 B1 | * 11/2001 | Ukechi et al. ................. | 385/14 |
| 6,332,719 B1 | * 12/2001 | Nishikawa et al. ........... | 385/88 |
| 6,404,960 B1 | * 6/2002 | Hibbs-Brenner et al. ..... | 385/52 |

FOREIGN PATENT DOCUMENTS

| | | |
|---|---|---|
| EP | 0798576 A2 | 10/1997 |
| JP | 6-118256 | 4/1994 |

OTHER PUBLICATIONS

Hashimoto, T., et al, "Hybrid Integration of Spot–Size Cinverted Laser Diode on Planar Lightwave Circuit Platform by Passive Alignment Technique," IEEE Photonics Technology Letters, vol. 8, No. 11, Nov. 1996, pp. 1504–1506.

Okano, H., et al, "Passive Aligned Hybrid Integrated WDM Transeiver Module Using Planar Lightwave Circuit Platform," IEICE Trans. Electron., vol. E80–C, No. 1, Jan. 1997, pp. 112–116.

Sutherland, J., et al., "Alignment Tolerance Measurements and Optical Coupling Modeling for Optoelectronic Array Interface Assemblies," Proceedings of the Electronic Components and Technology Conference, Cornell University, School of Electrical Engineering, Ithaca, New York, May. 1996, pp. 480–486.

Patent Abstracts of Japan, Publication No. 6–118256, Apr. 28, 1994.

* cited by examiner

*Primary Examiner*—Akm E. Ullah
*Assistant Examiner*—Jerry T Rahll
(74) *Attorney, Agent, or Firm*—MacPherson Kwok Chen & Heid LLP

(57) ABSTRACT

The fabrication of an optical component comprising an optical waveguide and positioning marker on a same substrate is facilitated, and the yield of the fabrication process for such an optical component is increased. By forming the core segment of the optical waveguide and the positioning marker in a same step, the positional accuracy between the core segment and the positioning marker can be improved without requiring a high level of expertise or expensive equipment such as a photographic exposure device. In the optical component comprising an optical waveguide and positioning marker on a substrate, the positioning marker is provided with rounded corners or a curved profile whereby it is possible to avoid the stress concentration which would otherwise develop due to the difference in thermal expansion between the various layers at the time of thermal processing, and the cracks which would otherwise develop in the positioning marker and the surrounding layers.

12 Claims, 5 Drawing Sheets

(a)

(b)

(e)

(c)

(f)

(d)

(g)

(h)

(k)

(i)

(l)

(j)

(m)

(n)

(q)

(o)

(r)

(p)

(s)

OPTICAL COMPONENT HAVING POSITIONING MARKERS AND METHOD FOR MAKING THE SAME

TECHNICAL FIELD

The present invention relates to an optical component comprising an optical waveguide and positioning markers which are formed on a quartz glass substrate for applications such as an optical transmission/reception module in the field of optical communication, and a method for making the same.

BACKGROUND OF THE INVENTION

In an optical transmission/reception module for optical communication, the quality of connection, in particular the accuracy of optical path alignment, between the optical fiber and the optical device such as a photodiode and laser diode on the substrate dictates the performance of the module. Also, in such an optical transmission/reception module for optical communication, typically, the optical fiber is connected to the optical device via an optical waveguide, instead of connecting them directly to each other. Therefore, the substrate on which the waveguide is formed includes a marker, typically on each of the four corners of the substrate, to properly position it with respect to the optical device or the optical fiber.

As can be readily appreciated, the positioning marker is required to be properly positioned with respect to the optical waveguide at a high precision. Conventionally, the optical waveguide and positioning markers were formed in separate steps, and the positioning of the patterning mask was required to be performed at a high precision in these two separate steps. This required a high level of expertise, a complex work process, and expensive equipment such as a photographic exposure device.

During the fabrication process of such an optical transmission/reception module, a thermal processing step is typically conducted primarily for removing voids and internal stresses which tend to develop in stepped portions when forming the clad layer. Because the materials for forming the optical waveguide (such as the glass that is used for forming the clad layer) and the material used for forming the positioning marker (such as metal) have different thermal expansion coefficients, cracks may be generated between them depending on the shape of the positioning marker. This may affect the reliability of the component, and may reduce the yield of the production process.

BRIEF SUMMARY OF THE INVENTION

In view of such problems of the prior art, a primary object of the present invention is to facilitate the fabrication of an optical component comprising an optical waveguide and positioning marker on a same quartz or silicon substrate.

A second object of the present invention is to improve the reliability of such an optical component, and increase the yield of the fabrication process for such an optical component.

A third object of the present invention is to allow a positioning marker to be formed in such an optical component both accurately and economically.

According to the present invention, such objects can be accomplished by providing a method for making an optical component comprising an optical waveguide and positioning marker which are formed on a common substrate, comprising the steps of: forming a lower clad layer on the substrate; forming a core layer having a refractive index different from that of the lower clad layer over the lower clad layer; patterning the core layer into a core segment having a prescribed shape; forming an upper clad layer having a similar refractive index as the lower clad layer over the lower clad layer and core segment; and forming a positioning marker on the substrate, the step of forming a positioning marker including the step of patterning a layer on the substrate so as to define the position of the positioning marker on the substrate; the patterning of the core segment and positioning marker being carried out by using a common mask.

This method provides an optical component comprising an optical waveguide and positioning marker which are formed on a common substrate, comprising: a substrate; a lower clad layer formed on the substrate; a patterned core segment having a refractive index different from that of the lower clad layer, and formed over the lower clad layer; an upper clad layer having a similar refractive index as the lower clad layer formed over the lower clad layer and core segment; and a positioning marker comprising a metallized patch placed over a layer on a same layer level as the core segment. Because the core segment and positioning marker are patterned by using a common mask, the positional relationship between the core segment and positioning marker can be established both accurately and simply.

To ensure a high level of recognizability, the step of forming the positioning marker may comprise the step of forming a metallized layer over the core layer so that the positioning marker may comprise a land region conformally underlying the metallized patch, and disposed on a same layer level as the core segment.

Such a structure can be easily realized if the step of patterning the core segment and positioning marker includes the steps of forming a photoresist layer, patterning the photoresist layer by using the common mask, and selectively removing the metallized layer and the core layer by etching.

If the step of patterning the positioning marker includes the step of forming an annular groove surrounding the positioning marker, the outer periphery of the positioning marker can be distinctly defined. If the annular groove is in turn surrounded by a layer which is on a same layer level as the core segment, the outer surface of the part of the outer clad layer near the positioning marker can be easily defined as a flat surface so that a favorable reference surface can be made available when mounting the optical component on a base.

To avoid creation of excessive stress concentration and/or thermal stress in the positioning marker, the positioning marker may be provided with rounded corners or a curved profile. If the substrate consists of substantially transparent material such as quartz glass, the positioning marker can be recognized from the reverse surface of the substrate, and this facilitates the positioning of the optical component when mounting it on a base.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
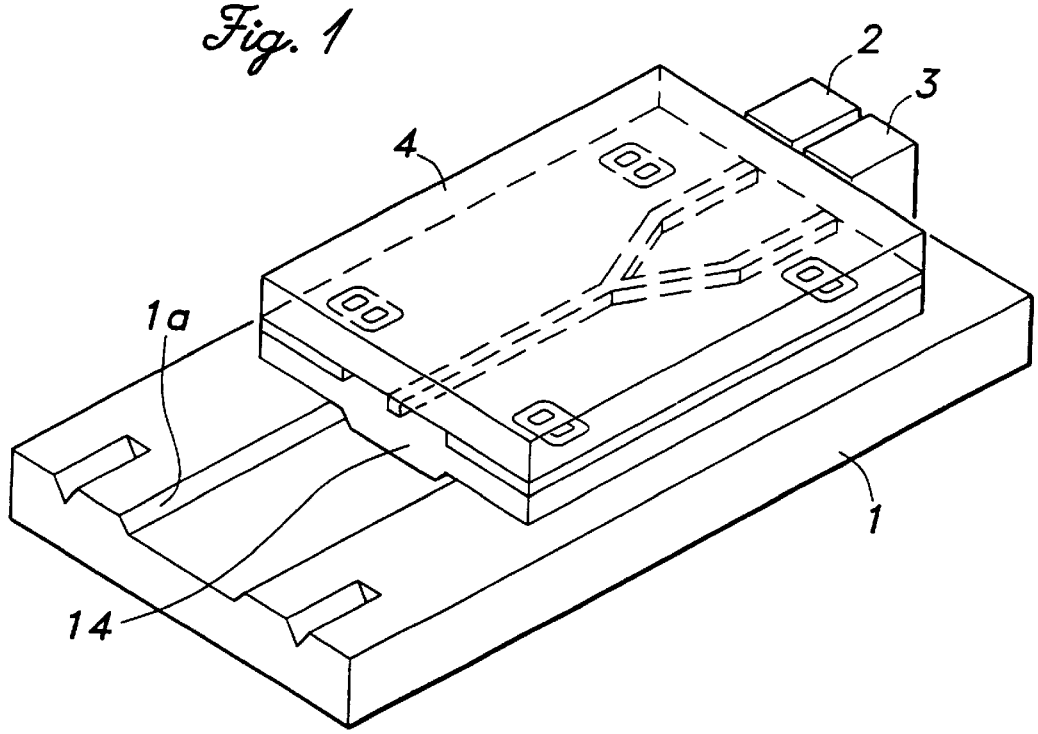
FIG. 1 is a perspective view of an optical transmission/reception module embodying the present invention.

FIG. 1 is a perspective view showing the structure of an optical transmission/reception module embodying the present invention. This transmission/reception module includes a photodiode 2, laser diode 3 and optical waveguide unit 4 mounted on a base 1 made of a silicon substrate. This optical waveguide unit 4 exemplifies the optical component according to the present invention. The end surface of the optical waveguide unit 4 is adapted to align with an end surface of an optical fiber not shown in the drawing.

Figure 2:
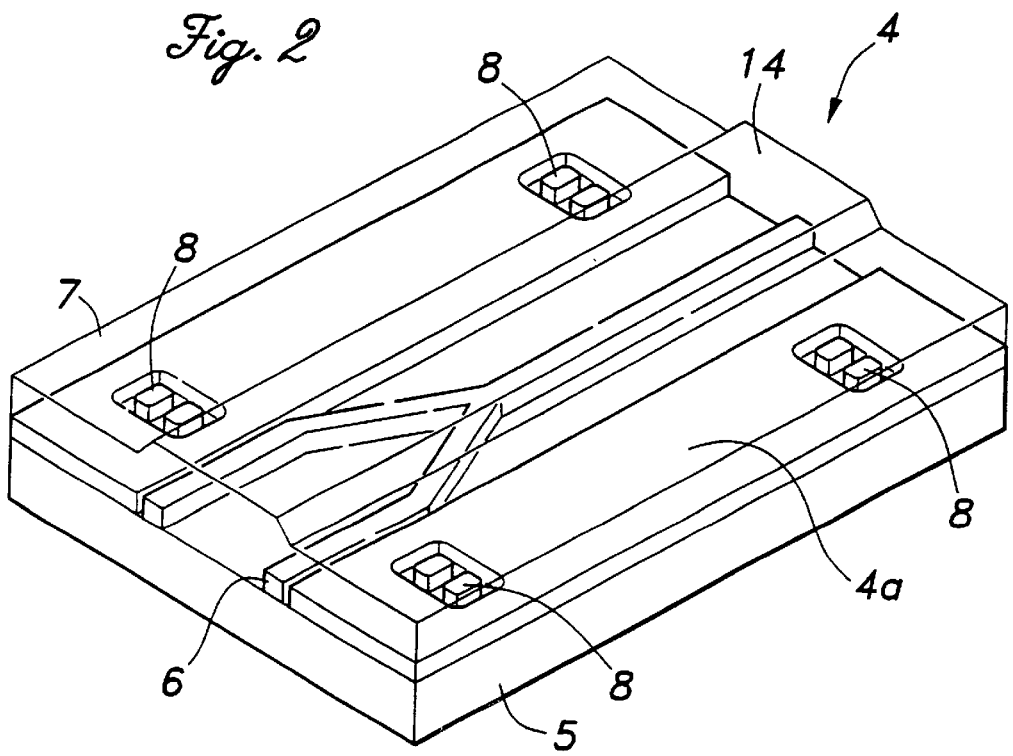
FIG. 2 is an enlarged view of the optical waveguide unit in FIG. 1.

As shown in FIG. 2, the optical waveguide unit 4 comprises a rectangular substrate 5 made of quartz glass, and a core segment 6 and clad layer 7 which are formed over the surface of the substrate 5. Four positioning markers 8 are formed at four corners of the substrate 5 one at each corner for properly positioning the optical waveguide unit 4 by aligning the positioning markers 8 with corresponding markers (not shown in the drawing) formed on the base 1. The surface 4a of the optical waveguide unit 4 on the side of the upper clad layer 7 is placed over the surface of the base 1 when assembling them.

Figure 3:
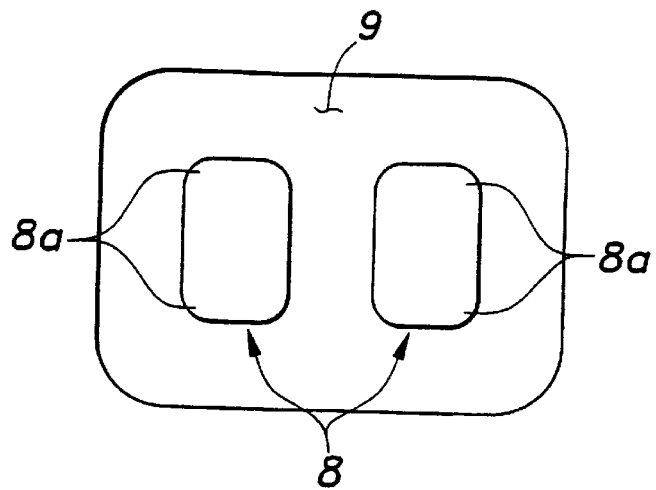
FIG. 3 is an enlarged plan view of an essential part of FIG. 2.
Figure 4:
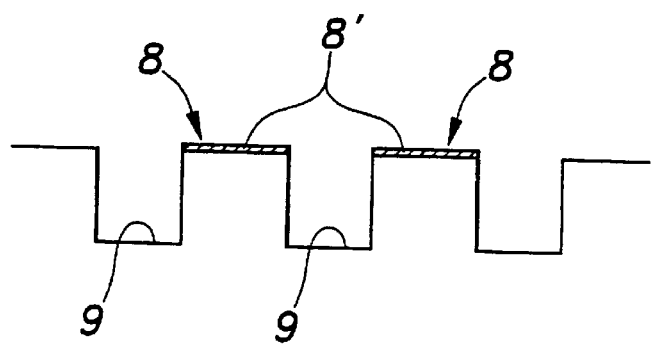
FIG. 4 is a sectional view of FIG. 3.

As shown in FIGS. 3 and 4, each positioning marker 8 is formed by depositing a layer 8', for instance, made of metal such as chromium over the layer forming the core segment 6, and forming a marker groove 9 by removing a peripheral part of the layer 8' at the same time as patterning the core segment 6, thereby forming a rectangular marker 8. The surface of each marker 8 is thus metallized so that the marker may be easily distinguished by the imaging process owing to a distinct difference in reflectivity from the surrounding part.

A thermal processing step is typically conducted during the manufacturing process of the optical waveguide unit 4 to remove voids and internal stresses that may develop in stepped parts thereof. In this connection, it may be feared that stress concentrations may develop in corners 8a due to the difference in thermal expansion between the chromium or other metallic film of each positioning marker 8 and the underlying layer 6' for forming the core segment 6 typically made of $SiO_2$, and between the clad layer 7 typically made of $SiO_2$ and the metallic film of the positioning marker 8. Such a stress concentration may cause cracks. Each corner of each positioning marker 8 is rounded so as to avoid generation of cracks. The marker groove 9 accommodates the difference in thermal expansion between the metallic film of the marker 8 and the clad layer 7. The four corners of the marker groove 9 are also rounded to avoid stress concentrations in the corners.

Figure 5:
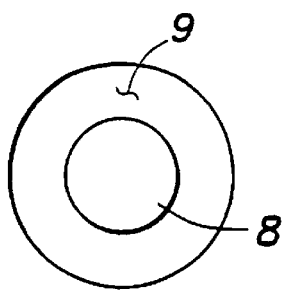
FIG. 5 is a plan view similar to FIG. 3 showing an embodiment modified from that shown in FIGS. 1 to 4.

Each positioning marker 8 was rectangular having rounded corners 8a in the above described embodiment, but the shape of the marker 8 may be freely selected so as to have a curved profile. In either case, cracks due to stress concentration can be avoided. For instance, each marker may be track-shaped or elliptic, or even circular as illustrated in FIG. 5, to even more effectively avoid stress concentration.

Figure 6:
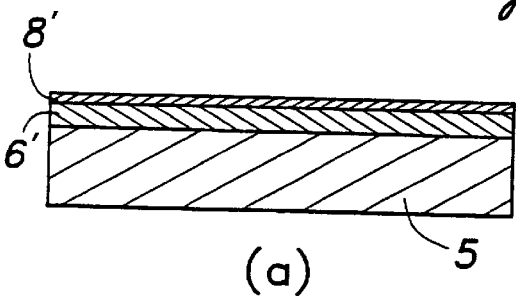
FIGS. 6, 7 and 8 are diagrams illustrating different steps (a) to (s) of fabricating an optical waveguide unit exemplifying the optical component embodying the present invention.
Figure 6:
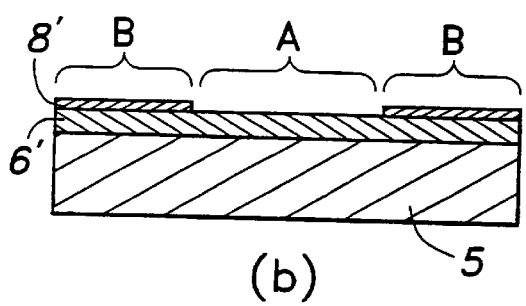
Figure 6:
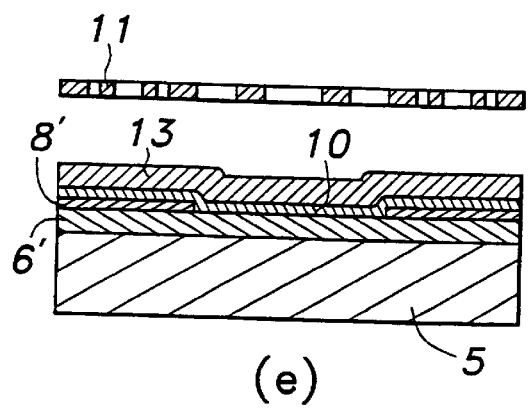
Figure 6:
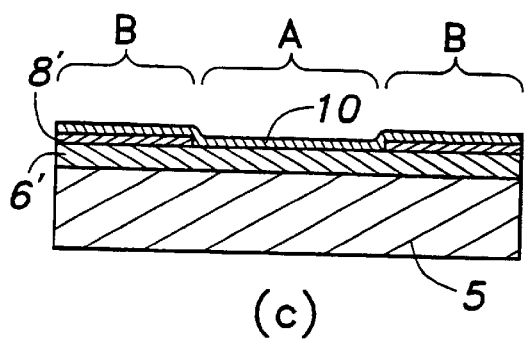
Figure 6:
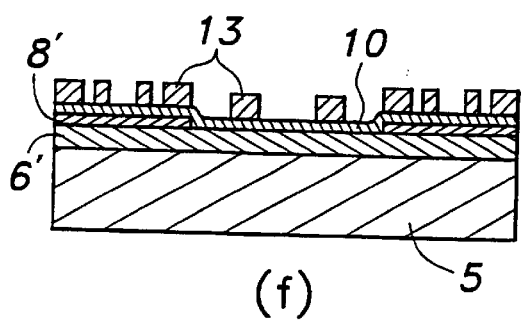
Figure 6:
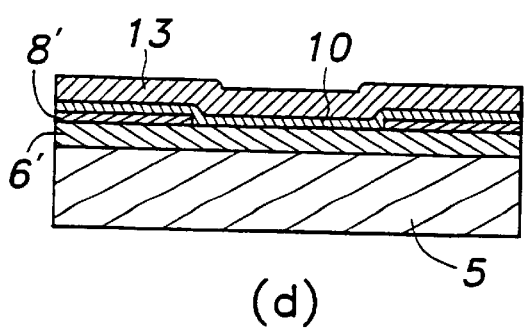
Figure 6:
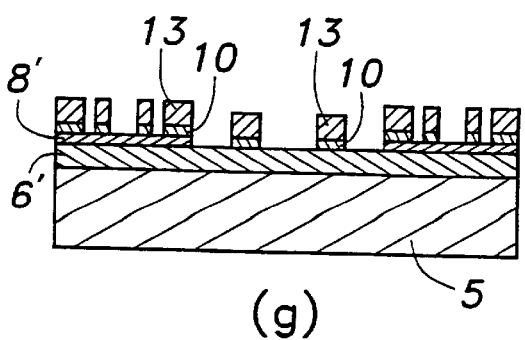
Figure 7:
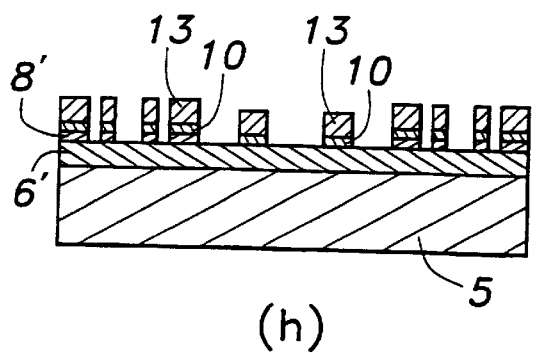
Figure 7:
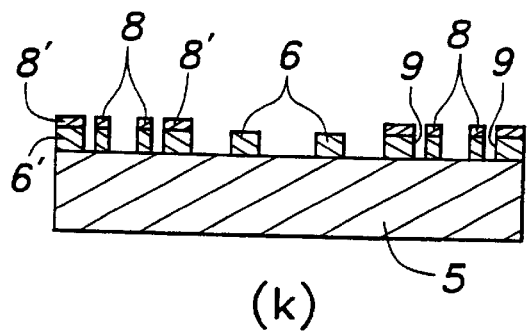
Figure 7:
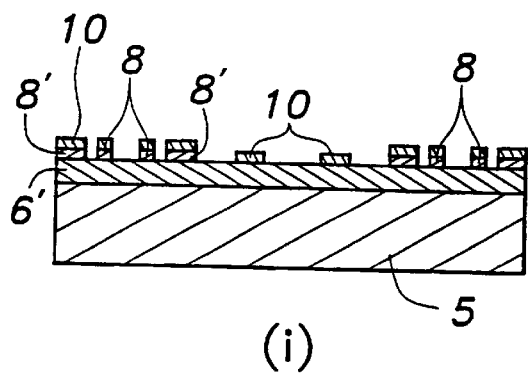
Figure 7:
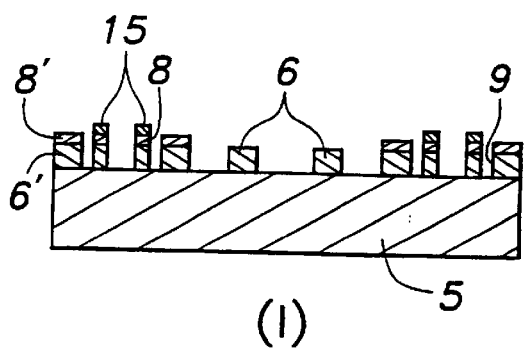
Figure 7:
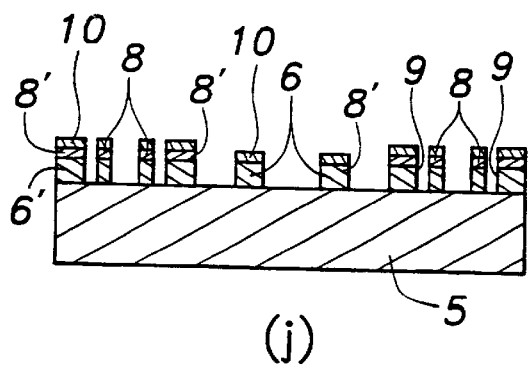
Figure 7:
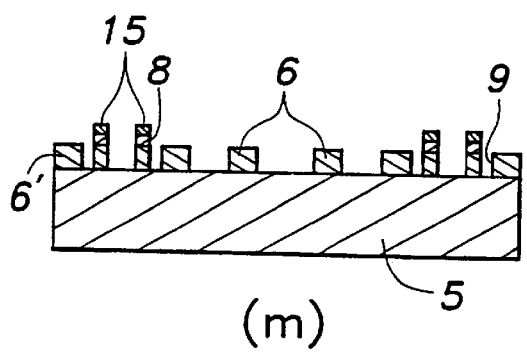
Figure 8:
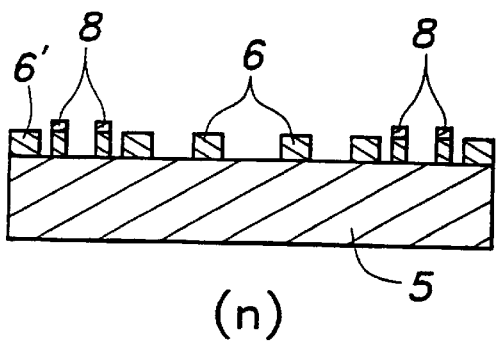
Figure 8:
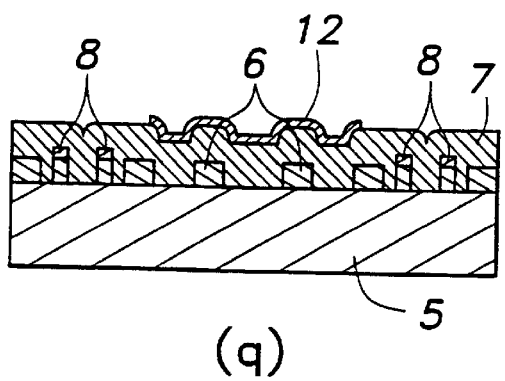
Figure 8:
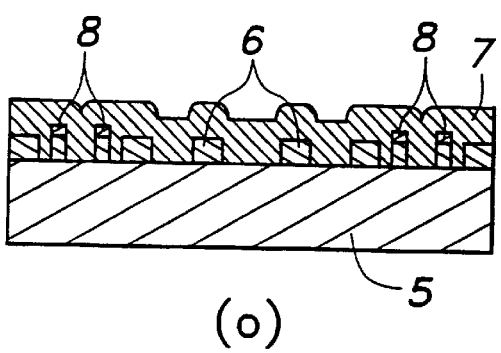
Figure 8:
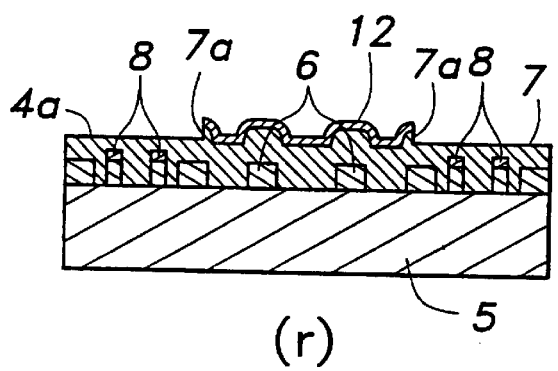
Figure 8:
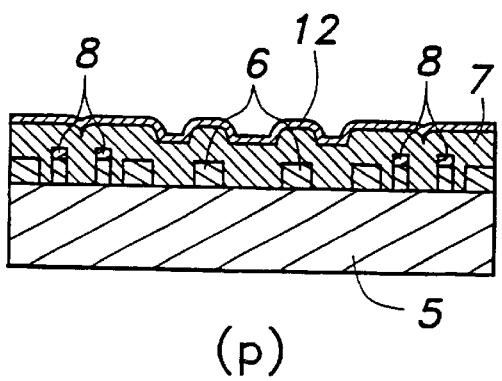
Figure 8:
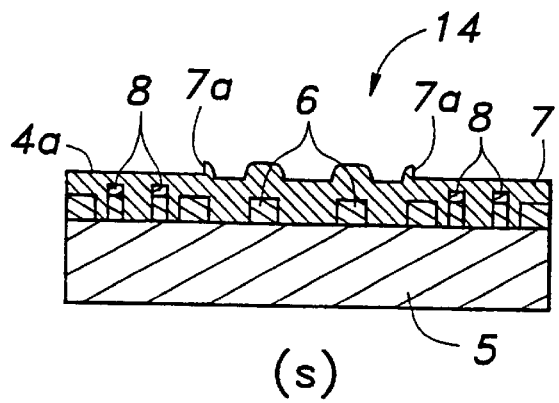

The different steps of fabricating the optical waveguide unit 4 are described in the following with reference to steps (a) to (g) shown in FIG. 6, steps (h) to (m) shown in FIG. 7 and steps (n) to (s) shown in FIG. 8. In this case, the substrate 5 is made of quartz glass, and serves itself as a lower clad layer. A layer 6' for forming a core segment 6 and a chromium layer 8' are formed on the substrate 5 (FIG. 6(a)). The chromium layer 8' will be used as a part of the positioning markers 8, and is removed at least from the part serving as the optical waveguide (FIG. 6(b)). If desired, the chromium layer 8' may be formed only in the area where the positioning markers will be formed. In FIG. 6(b), the area from which the chromium layer 8' is removed indicated by letter A, and the area left with the chromium layer 8' is indicated by letter B.

Then, a protective layer 10 consisting of WSi or the like for dry etching is generally formed (FIG. 6(c)), and a photoresist layer 13 is formed on top of the protective layer 10 (FIG. 6(d)). By using a common mask 11 (FIG. 6(e)), the photoresist layer 13 is patterned so as to define the shapes of the core segment 6 and the positioning markers 8 (FIG. 6(f)). By using the thus patterned photoresist layer 13 as a mask, the protective layer 10 is selectively removed (FIG. 6(g)). At this point, although the part of the region B surrounding the marker groove 9 is not needed for the functions of the positioning markers 8 and the optical waveguide, the protective layer 10 is left in this part. This is because the surface 4a of the optical waveguide unit 4 that is to engage the base 1 may be easily formed into a planar surface in the subsequent steps as discussed hereinafter.

Then, the chromium layer 8' is selectively removed by wet etching, the photoresist layer 13 serving as a mask (step 7(h)), and the photoresist layer 13 is removed (step 7(i)). Similarly, by using the protective layer 10 as a mask, the core layer 6' is selectively removed by dry etching so as to define the pattern of the core segment 6 (step 7(j)). At this point, the periphery of the positioning marker 8 is etched away so as to form the annular marker groove 9. The positioning marker 8 is therefore defined as a land region surrounded by the marker groove 9 in region B. The protective layer 10 is then removed (step 7(k)).

A photoresist layer 15 is patterned only over the parts designed to be positioning marker 8 (step 7(l)), and the part of the chromium layer 8' other than that for forming the positioning marker 8 is removed by wet etching (step 7(m)). The photoresist layer 15 is then removed (step 8(n)).

The upper clad layer 7 is formed over the entire surface including the core segment 6, the positioning marker 8 and the substrate 5 (FIG. 8(o)). This completes the structure serving as a waveguide. As shown in FIG. 1, the base 1 is provided with a longitudinal groove 1a for the purpose of approximately positioning the optical waveguide unit 4 by guiding a corresponding projection 14 formed on the corresponding surface 4a of the upper clad layer 7 of the optical waveguide unit 4. The process of forming this corresponding projection 14 is described in the following.

A protective layer 12 made of WSi or the like is formed on the upper clad layer 7 (FIG. 8(p)), and patterned so as to define the corresponding projection 14 (FIG. 8(q)). Dry etching is performed on the upper clad layer 7 using the protective layer 12 as a mask so as to define the corresponding projection 14 with a pair of stepped portions 7a (FIG. 8(r)). Thereafter, the protective layer 12 is removed (FIG. 8(s)). The reference surface 4a defined on either side of the stepped portions 7a are used for the vertical positioning of the optical waveguide unit 4 by engaging the corresponding surface of the base 1 when mounting it on the base 1. As mentioned earlier, because the positioning markers 8 and the surrounding areas are generally planar except for the regions of the marker grooves 9, the overlying clad layer 7 presents a generally planar outer surface. Therefore, the corresponding projection 14 and the reference surface 4a can be formed with a relatively shallow etching.

The reference surface 4a is then bonded to the base 1, and the photodiode 2 and laser diode 3 are mounted on the silicon substrate 1. This assembly is aligned with an optical fiber not shown in the drawing to complete the optical transmission/reception module.

As can be appreciated from the foregoing description, according to the method for fabricating an optical component, because the core segment of the optical waveguide and the positioning marker are formed in a same step, the positional accuracy between the core segment and the positioning marker can be improved without requiring a high level of expertise or expensive equipment such as a photographic exposure device. The optical component fabricated by such a method ensures a high level of positional precision when assembling the optical fiber and optical devices, and provides a high level of reliability because the positioning marker and the core layer of the optical waveguide are formed on a same layer level, and are covered by a clad layer.

The present invention can be applied to the case where a silicon substrate is used for the substrate of the optical waveguide unit. In this case, the lower clad layer or a buffer layer is formed in the silicon substrate, and the core segment is formed on top of it. Because the silicon substrate is not transparent, the positioning markers are required to be recognized from the direction of the upper clad layer.

INDUSTRIAL APPLICABILITY

According to the present invention, in an optical component comprising an optical waveguide and positioning marker which are formed on a common substrate, the positioning marker can be formed both accurately and economically, and the yield of the fabrication process for such an optical component can be increased. Therefore, the present invention has a high level of industrial applicability.

What is claimed is:

1. A method for making an optical component comprising an optical waveguide and positioning marker which are formed on a common substrate, comprising the steps of:
    forming a lower clad layer on the substrate;
    forming a core layer having a refractive index different from that of the lower clad layer over the lower clad layer;
    patterning the core layer into a core segment having a prescribed shape;
    forming an upper clad layer having a similar refractive index as the lower clad layer over the lower clad layer and core segment; and
    forming a positioning marker on the substrate, the step of forming a positioning marker including the step of patterning a layer on the substrate so as to define the position of the positioning marker on the substrate;
    the patterning of the core segment and positioning marker being carried out by using a common mask.

2. A method for making an optical component according to claim 1, wherein the step of forming a positioning marker comprises the step of forming a metallized layer over the core layer.

3. A method for making an optical component according to claim 2, wherein the step of patterning of the core segment and positioning marker includes the step of forming a photoresist layer, and patterning the photoresist layer by using the common mask.

4. A method for making an optical component according to claim 3, wherein the step of patterning the core segment and positioning marker further includes the step of selectively removing the metallized layer and the core layer by etching.

5. A method for making an optical component according to claim 4, wherein the step of patterning the positioning marker includes the step of forming an annular groove surrounding the positioning marker.

6. A method for making an optical component according to claim 5, wherein the positioning marker is provided with rounded corners or a curved profile.

7. A method for making an optical component according to claim 1, wherein the substrate consists of substantially transparent material so that the positioning marker is adapted to be recognized from the reverse surface of the substrate.

8. An optical component comprising an optical waveguide and positioning marker which are formed on a common substrate, comprising:
    a substrate;
    a lower clad layer formed on the substrate;
    a patterned core segment having a refractive index different from that of the lower clad layer, and formed over the lower clad layer;
    an upper clad layer having a similar refractive index as the lower clad layer formed over the lower clad layer and core segment; and
    a positioning marker comprising a metallized patch placed over a layer on a same layer level as the core segment and made of a same material as the core segment.

9. An optical component according to claim 8, wherein the positioning marker further comprises a land region conformally underlying the metallized patch, and disposed on a same layer level as the core segment.

10. An optical component according to claim 9, wherein the positioning marker is surrounded by an annular groove which is in turn surrounded by a layer which is on a same layer level as the core segment.

11. An optical component according to claim 10, wherein the positioning marker is provided with rounded corners or a curved profile.

12. An optical component according to claim 8, wherein the substrate consists of substantially transparent material so that the positioning marker is adapted to be recognized from the reverse surface of the substrate.

* * * * *